F. J. SCHRAEDER, Jr.
HOISTING APPARATUS.
APPLICATION FILED JULY 22, 1918.
Reissued Sept. 30, 1919.
14,731
2 SHEETS—SHEET 1.
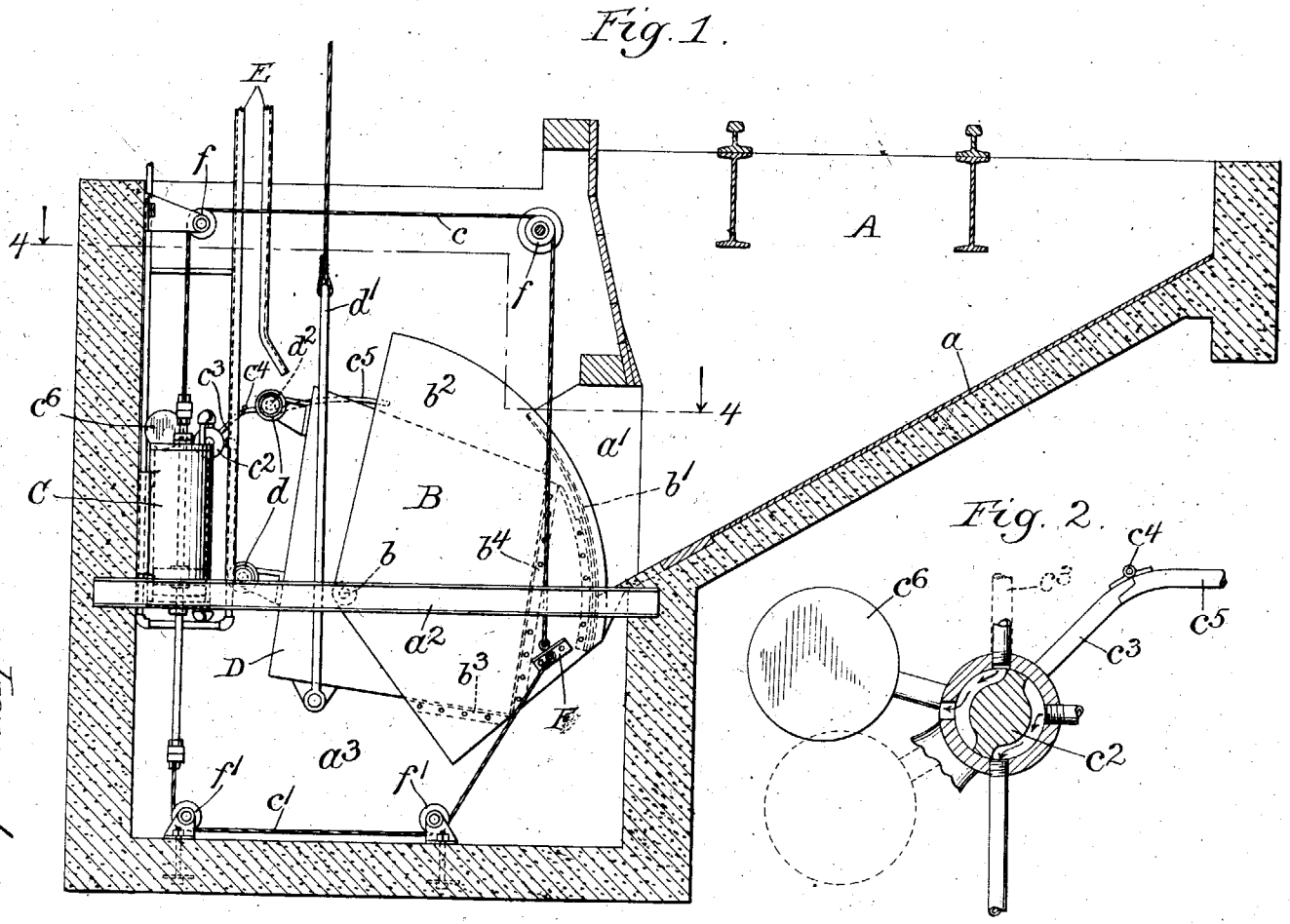
Witness,
Edward T. Wray.
Inventor.
Frank J. Schraeder Jr.
by Parker & Carter
Attorneys.

F. J. SCHRAEDER, Jr.
HOISTING APPARATUS.
APPLICATION FILED JULY 22, 1918.
Reissued Sept. 30, 1919.
14,731.
2 SHEETS—SHEET 2.
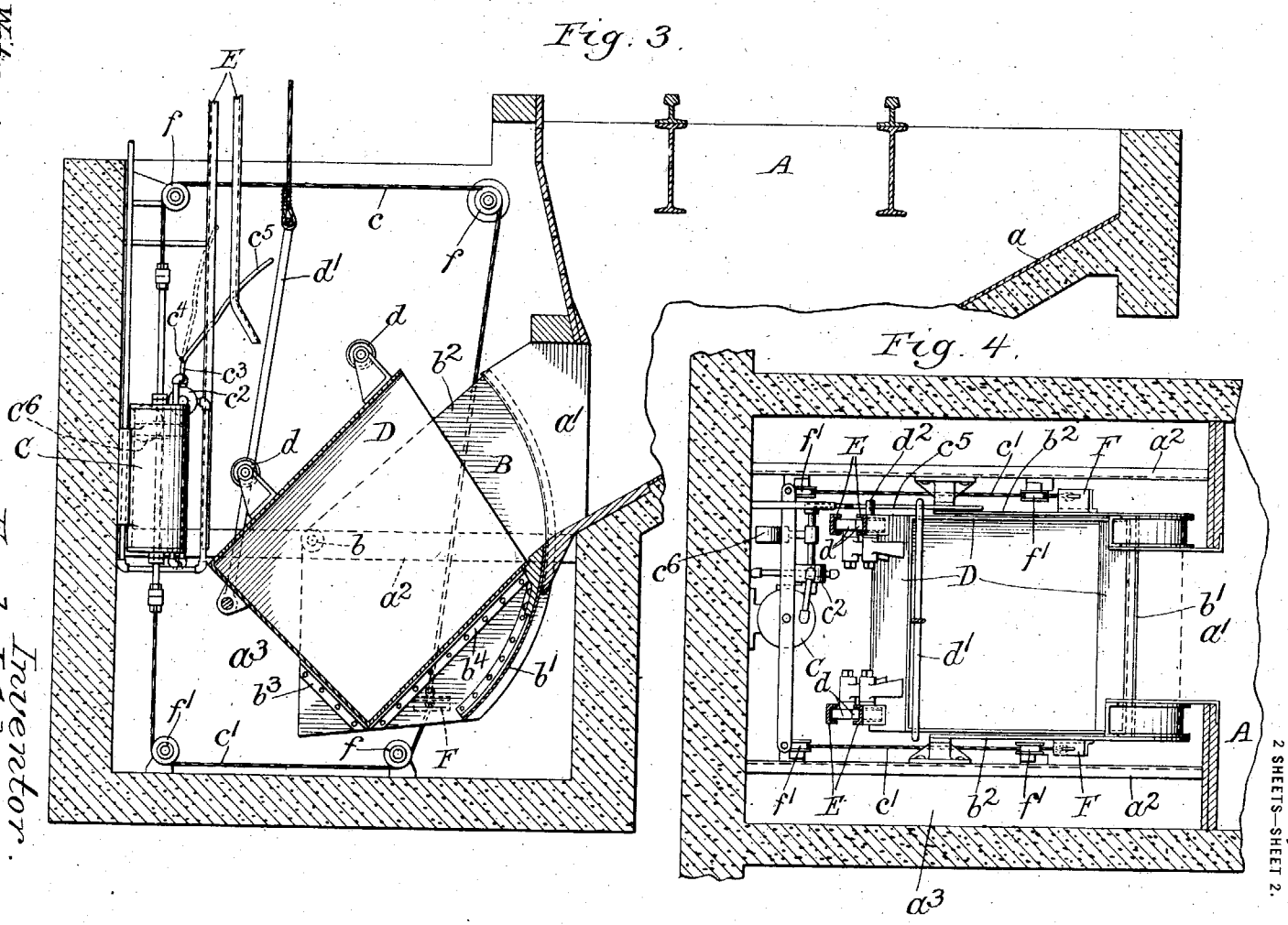
Witness.
Edward T. Wray.
Inventor.
Frank J. Schraeder Jr.
by Parker & Carter
Attorneys.

UNITED STATES PATENT OFFICE.

FRANK J. SCHRAEDER, JR., OF GLENELLYN, ILLINOIS.

HOISTING APPARATUS.

14,731. Specification of Reissued Letters Patent. Reissued Sept. 30, 1919.

Original No. 1,256,169, dated February 12, 1918, Serial No. 723,087, filed September 30, 1912. Application for reissue filed July 22, 1918. Serial No. 246,252.

*To all whom it may concern:*

Be it known that I, FRANK J. SCHRAEDER, Jr., a citizen of the United States of America, and resident of Glenellyn, Dupage county, Illinois, have invented a certain new and useful Improvement in Hoisting Apparatus, of which the following is a specification.

My invention relates to hoisting apparatus in general, but more particularly to that involving a bucket which receives the load and travels up and down, and especially to apparatus for handling coal.

Generally stated, the object of my invention is to provide a novel and improved hoisting apparatus of the foregoing general character.

A special object is to provide an improved construction and arrangement whereby the coal may be discharged directly from the bin into the bucket, without the use of intermediate conveying devices, and whereby the gate for the discharge opening of the bin is automatically controlled by the movements of the bucket.

It is also an object to provide certain details and novel features of construction tending to increase the general efficiency and serviceability of a coal bin and hoisting apparatus therefor of this particular character.

To these and other useful ends my invention consists in matters hereinafter set forth and claimed.

In the accompanying drawings,

Figure 1 is a side elevation of a hoisting apparatus embodying the principles of my invention, showing the concrete coal bin therefor in vertical section, and showing the bucket in position to open the gate and receive the discharge of coal from the bin;

Fig. 2 is an enlarged detail sectional view of the valve employed for automatically controlling the movements of the discharge gate;

Fig. 3 is a view similar to Fig. 1, but showing the said bucket and gate in vertical section, and in position to enable the bucket to receive a load of coal from the discharge opening of the bin;

Fig. 4 is a horizontal section on line 4—4 in Fig. 1.

As thus illustrated, my invention comprises a concrete coal bin A, of any suitable, known or approved construction, and provided at the lower edge of its inclined bottom $a$ with a lateral discharge opening $a^1$, through which the coal is allowed to escape. Normally this discharge opening is closed by the pivoted gate B, which latter is mounted to turn about an axis $b$ of any suitable character supported by the parallel and horizontally disposed I-beams $a^2$, between which the said gate swings up and down, and which are supported by the concrete walls of the pit $a^3$ that forms a part of the concrete coal bin structure. The said gate has a front wall $b^1$ that shuts off the coal when the gate is in the position shown in Fig. 1, and which is curved about the axis $b$, whereby the said wall $b^1$ may come close to the sides of the discharge opening in the manner illustrated. The sides $b^2$ of the gate are connected together by the said wall $b^1$ and are provided on their inner surfaces with the cleats or angle irons $b^3$ and $b^4$ in the manner shown more clearly in Fig. 3.

A cylinder C is suitably mounted within the pit, and provided internally with piston mechanism of any suitable, known or desired character, which mechanism is connected with the said gate B by means of the upper and lower ropes or chains $c$ and $c^1$, whereby the said mechanism is capable of moving the said gate up and down about its horizontal and transverse axis of movement. A valve $c^2$, of any suitable, known or approved character, is provided for controlling the motive fluid by which the piston mechanism is operated, and the said valve is preferably provided with a lever $c^3$ by which it is operated. This lever is provided with a knuckle joint $c^4$ which permits the outer end portion $c^5$ of said lever to swing upward, without operating the said valve, but which operates the said valve when the said lever is moved downward. A weight $c^6$, or any other suitable means, may be employed for holding the said lever in normal position, as shown in Fig. 3, whereby the motive fluid is controlled to cause the piston mechanism to close the gate B by swinging it upward.

The bucket D is of any suitable form or character, and is adapted to fit between the side walls $b^2$ of the gate, and to enter the seat formed by the angle iron cleats $b^3$ and $b^4$ disposed on the inner surfaces of said walls, in the manner shown in Fig. 3. Said bucket is provided with wheels $d$ that travel up and down in the guides E, which latter are supported in any suitable manner, the said bucket being provided with an operating connection $d^1$ by which it is raised and lowered, and which permits it to tilt into the position necessary for receiving the coal from the discharge opening of the bin. One of the upper wheels of the bucket is provided with a laterally projecting axle or journal $d^2$ that strikes the lever portion $c^5$ when the bucket descends into the pit, and which causes said lever to assume the position shown in Fig. 1, as soon as the bucket has fallen over into the position shown. This reverses the piston mechanism of the cylinder C, by manipulation of the valve $c^2$, causing the gate B to assume the position shown in Fig. 3, and thus carrying the bucket D into position for loading. At about the time that the bucket assumes the position shown in Fig. 3, and when it is entirely filled, the portion $d^2$ releases the lever $c^5$, thus permitting the weight $c^6$ to operate the valve $c^2$ and thus again reverse the piston mechanism, whereby the gate and bucket are automatically brought back into the position shown in Fig. 1. Then when the bucket is raised in the guides, the portion $d^2$ strikes the under side of the lever portion $c^5$, causing the latter to assume the position shown in dotted lines in Fig. 3; but as soon as the bucket has passed upwardly the said lever portion $c^5$ falls back into the position shown in full lines in Fig. 3, which latter position is the normal condition of the said lever.

During the time that the bucket is ascending in the guides E, the piston mechanism of the cylinder C remains in position to hold the gate B in closed position. When the bucket descends, the portion $d^2$ again strikes the lever portion $c^5$, bringing the latter into the position shown in Fig. 1, and the operation of filling the bucket is then repeated in the manner shown and described.

In this way the gate B serves not only to control the discharge of the coal from the bin A, but also to support the bucket and automatically bring the latter into loading position, and then automatically return the bucket to a position for entering the guides. The bucket receives the discharge of coal directly from the bin, without the necessity of intermediate devices, and consequently the apparatus is both simplified and rendered more efficient in service. The hoisting apparatus can be operated rapidly without danger of breakage or other trouble.

While the bucket is filling, the sides $b^2$ of the gate B serve as guards to keep the coal from discharging outside of the bucket. Also, the ropes $c$ and $c^1$ are attached to the gate B at F, and are arranged to travel on the upper and lower sheaves $f$ and $f^1$, or in any suitable manner.

What I claim as my invention is:

1. In apparatus of the character described, the combination of a stationary coal bin provided with a discharge opening, a hoisting bucket, and means whereby said bucket is operative to receive the load directly from said opening, said means including a movable element for tilting said bucket at an angle to present its mouth to said opening, which element remains below when the bucket is hoisted.

2. In apparatus of the character described, the combination of a stationary coal bin provided with a discharge opening, a hoisting bucket, and means whereby said bucket is operative to receive the load directly from said opening, said means including a movable element for presenting the mouth of said bucket to said opening, which element has a fixed axis of motion.

3. In apparatus of the character described, a bin, a discharge gate for said bin, means for opening and closing said gate, a hoisting bucket, and means rigid with the gate for supporting said bucket, said gate being open when the bucket is supported in loading position by said means, said means including a pair of side plates which embrace the bucket and serve as lateral guides for the mouth thereof.

4. Apparatus of the character described, comprising a structure having a bucket runway, a bucket mounted for travel on said runway, a movable bucket holder at the base of the runway, the bucket being movable into and out of the holder and also movable therewith, and a receptacle arranged to discharge into the bucket when the latter is moved with the holder into proper relation to the receptacle.

5. Apparatus of the character described, comprising a structure having a bucket runway, a bucket mounted for travel on said runway, a movable bucket holder at the base of the runway, the bucket being movable into and out of the holder and also movable therewith, a receptacle arranged to discharge into the bucket when the latter is moved with the holder into proper relation with the receptacle, and means for controlling the discharge from the receptacle into the bucket.

6. In apparatus of the character described, the combination of a stationary bin provided with a discharge opening, a hoisting bucket, and means whereby said bucket is operative to receive the load directly from said opening, said means including a movable element for tilting said bucket at an angle to present its mouth to said opening, which element remains below when the bucket is hoisted, and said element having means operated by upward movement thereof to close said opening when the bucket is tilted back into hoisting position.

7. In apparatus of the character described, the combination of a stationary bin provided with a discharge opening, a hoisting bucket, and means whereby said bucket is operative to receive the load directly from said opening, said means including a movable element for presenting the mouth of said bucket to said opening, which element has a fixed axis of motion, and said element having means operated by upward movement thereof to close said opening when the bucket is tilted back into hoisting position.

8. In apparatus of the character described, the combination of a stationary bin provided with a discharge opening, a hoisting bucket, and means whereby said bucket is operative to receive the load directly from said opening, said means including a movable element for tilting said bucket at an angle to present its mouth to said opening, which element remains below when the bucket is hoisted, and said element having side plates which serve as guards at each side of said opening to direct the discharge therefrom into said bucket.

9. In apparatus of the character described, the combination of a stationary bin provided with a discharge opening, a hoisting bucket, and means whereby said bucket is operative to receive the load directly from said opening, said means including a movable element for presenting the mouth of said bucket to said opening, which element has a fixed axis of motion, and said element having side plates which serve as guards at each side of said opening to direct the discharge therefrom into said bucket.

10. In a bucket elevator, the combination of a bucket, a framework for tilting the bucket, a chute, and a gate for said chute adapted to gradually open with the bucket as it is being tilted so that said gate and bucket tilt about a common axis, said bucket when tilted occupying a position so that the mouth thereof opens squarely to the chute.

11. In a bucket elevator, the combination of a bucket, a framework for tilting the bucket, a chute, and a gate for said chute adapted to gradually open with the bucket as it is being tilted so that said gate and bucket tilt about a common axis, said bucket when tilted occupying a position so that the mouth thereof opens squarely to the chute, the arrangement being such that said gate tends to gravitate into open position.

12. In a coal handling apparatus the combination of a bin having a discharge opening with a vertically movable hoisting bucket having a receiving opening, means for moving the bucket opening laterally to a point beneath the bin opening so that the bin can discharge directly into the bucket without the aid of intermediate movable conveying means, a gate for the bin opening and means whereby the gate is operated responsive to the lateral movement of the bucket opening.

13. In a coal handling apparatus the combination of a bin having a discharge opening outside of the vertical line of travel of the bucket with a vertically movable hoisting bucket having a receiving opening, means for moving the bucket opening laterally to a point beneath the bin opening so that the bin can discharge directly into the bucket without the aid of intermediate movable conveying means, a gate for the bin opening and means whereby the gate is operated responsive to the lateral movement of the bucket opening.

14. In a coal handling apparatus the combination of a bin having a discharge opening with a vertically movable hoisting bucket having a receiving opening, means for tilting the bucket so as to move its opening laterally to a point beneath the bin opening so that the bin can discharge directly into the bucket without the aid of intermediate movable conveying means, a gate for the bin opening and means whereby the gate is operated responsive to the lateral movement of the bucket opening.

15. In a coal handling apparatus the combination of a bin having a discharge opening outside of the vertical line of travel of the bucket with a vertically movable hoisting bucket having a receiving opening, means for tilting the bucket so as to move its opening laterally to a point beneath the bin opening so that the bin can discharge directly into the bucket without the aid of intermediate movable conveying means, a gate for the bin opening and means whereby the gate is operated responsive to the lateral movement of the bucket opening.

16. In a coal handling apparatus the combination of a bin having a discharge opening with a vertically movable hoisting bucket having a receiving opening, means for moving the bucket opening laterally to a point beneath the bin opening so that the bin can discharge directly into the bucket without the aid of intermediate movable conveying means, a cut-off gate for the bin opening and means whereby the gate is operated responsive to the lateral movement of the bucket opening to leave a free passageway from the bin to the bucket.

17. In a coal handling apparatus the combination of a bin having a discharge opening outside of the vertical line of travel of the bucket with a vertically movable hoisting bucket having a receiving opening, means for moving the bucket opening laterally to a point beneath the bin opening so that the bin can discharge directly into the bucket without the aid of intermediate movable conveying means, a cut-off gate for the bin opening and means whereby the gate is operated responsive to the lateral movement of the bucket opening to leave a free passageway from the bin to the bucket.

18. In a coal handling apparatus the combination of a bin having a discharge opening with a vertically movable hoisting bucket having a receiving opening, means for tilting the bucket so as to move its opening laterally to a point beneath the bin opening so that the bin can discharge directly into the bucket without the aid of intermediate movable conveying means, a cut-off gate for the bin opening and means whereby the gate is operated responsive to the lateral movement of the bucket opening to leave a free passageway from the bin to the bucket.

19. In a coal handling apparatus the combination of a bin having a discharge opening outside of the vertical line of travel of the bucket with a vertically movable hoisting bucket having a receiving opening, means for tilting the bucket so as to move its opening laterally to a point beneath the bin opening so that the bin can discharge directly into the bucket without the aid of intermediate movable conveying means, a cut-off gate for the bin opening and means whereby the gate is operated responsive to the lateral movement of the bucket opening to leave a free passageway from the bin to the bucket.

20. In a coal handling apparatus and in combination, a bin having a discharge opening, a hoisting bucket arranged to travel between said bin and higher level, said bucket having a receiving opening, means for moving the bucket opening laterally to a point beneath the bin opening so that the bin can discharge directly into the bucket without the aid of intermediate movable conveying means, a gate for the bin opening, and means whereby the gate is operated responsive to the lateral movement of the bucket opening.

Signed by me at Chicago, Illinois, this 13th day of July, 1918.

FRANK J. SCHRAEDER, Jr.

Witnesses:

Minnie M. Lindenau,
Christina Deans.